(12) United States Patent  
Richmond et al.

(10) Patent No.: US 9,577,697 B2  
(45) Date of Patent: Feb. 21, 2017

(54) PROTECTIVE CASE WITH STYLUS ACCESS FEATURE

(71) Applicant: OTTER PRODUCTS, LLC, Fort Collins, CO (US)

(72) Inventors: Marc A. Richmond, San Diego, CA (US); Peter S Armstrong, Fort Collins, CO (US); Michael H. Kim, Marina Del Rey, CA (US); Steven A. Jones, San Diego, CA (US); Zachary W. Zupancic, Oceanside, CA (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

(21) Appl. No.: 15/167,554

(22) Filed: May 27, 2016

(65) Prior Publication Data

US 2016/0352383 A1 Dec. 1, 2016

Related U.S. Application Data

(60) Provisional application No. 62/167,223, filed on May 27, 2015.

(51) Int. Cl.
*H04M 1/725* (2006.01)
*A45C 11/00* (2006.01)
*H04B 1/3888* (2015.01)

(52) U.S. Cl.
CPC ............ *H04B 1/3888* (2013.01); *A45C 11/00* (2013.01); *H04M 1/72527* (2013.01); *A45C 2011/002* (2013.01)

(58) Field of Classification Search
CPC . A45C 11/00; A45C 2011/002; H04V 1/3888; H04M 1/72527; H04M 1/0283; H04M 1/18; H04M 1/0214; H04B 2001/3894
See application file for complete search history.

(56) References Cited

U.S. PATENT DOCUMENTS

| | | | |
|---|---|---|---|
| 2,164,221 A | 6/1939 | Hoover et al. | |
| 2,392,787 A | 1/1946 | Edmond | |
| 2,851,670 A | 9/1958 | Senior | |
| 3,023,885 A | 3/1962 | Kindseth | |
| 3,143,384 A | 8/1964 | Senior | |

(Continued)

FOREIGN PATENT DOCUMENTS

| | | |
|---|---|---|
| DE | 29612454 U1 | 9/1996 |
| EP | 1018680 A2 | 7/2000 |

(Continued)

*Primary Examiner* — Lewis West

(57) ABSTRACT

A waterproof protective case comprising a shell that at least partially encloses a portable electronic device, the shell having an aperture aligned with an opening of a storage area of the portable electronic device, the protective case including a cap that is removably attached to a stylus of the portable electronic device, the aperture of the shell configured to releasably retain a portion of the cap when the stylus is inserted into the opening of the storage area of the portable electronic device, the cap configured to form a waterproof seal when the cap is retained within the aperture of the shell, the cap configured to remove the stylus from the storage area of the protective electronic device while the portable electronic device is in the waterproof protective case.

20 Claims, 11 Drawing Sheets

(56) References Cited

U.S. PATENT DOCUMENTS

| | | | |
|---|---|---|---|
| 3,184,847 A | 5/1965 | Rosen |
| 3,482,895 A | 12/1969 | Becklin |
| 3,521,216 A | 7/1970 | Jerair |
| 3,590,988 A | 7/1971 | Hollar |
| 3,665,991 A | 5/1972 | Gillemot et al. |
| 3,689,866 A | 9/1972 | William |
| 3,832,725 A | 8/1974 | Cook |
| 3,922,477 A | 11/1975 | Glowacz |
| D243,698 S | 3/1977 | Gietzen |
| 4,097,878 A | 6/1978 | Cramer |
| 4,298,204 A | 11/1981 | Jinkins |
| 4,312,580 A | 1/1982 | Schwomma et al. |
| 4,335,930 A | 6/1982 | Feldman |
| 4,352,968 A | 10/1982 | Pounds |
| D267,713 S | 1/1983 | Noda et al. |
| 4,375,323 A | 3/1983 | Inagaki et al. |
| 4,383,743 A | 5/1983 | Nozawa et al. |
| 4,418,830 A | 12/1983 | Dzung et al. |
| 4,420,078 A | 12/1983 | Belt et al. |
| 4,440,464 A | 4/1984 | Spinner |
| 4,546,874 A | 10/1985 | Kirchhan |
| 4,584,718 A | 4/1986 | Fuller |
| 4,649,453 A | 3/1987 | Iwasawa |
| 4,658,956 A | 4/1987 | Takeda et al. |
| 4,683,587 A | 7/1987 | Silverman |
| 4,686,332 A | 8/1987 | Greanias et al. |
| 4,703,161 A | 10/1987 | McLean |
| 4,712,657 A | 12/1987 | Myers et al. |
| 4,733,776 A | 3/1988 | Ward |
| 4,762,227 A | 8/1988 | Patterson |
| 4,803,504 A | 2/1989 | Maeno et al. |
| 4,836,256 A | 6/1989 | Meliconi |
| 4,942,514 A | 7/1990 | Miyagaki et al. |
| 4,963,902 A | 10/1990 | Fukahori |
| 4,977,483 A | 12/1990 | Perretta |
| D313,790 S | 1/1991 | Hirabayashi |
| 4,994,829 A | 2/1991 | Tsukamoto |
| 5,002,184 A | 3/1991 | Lloyd |
| 5,025,921 A | 6/1991 | Gasparaitis et al. |
| 5,087,934 A | 2/1992 | Johnson |
| 5,092,458 A | 3/1992 | Yokoyama |
| 5,092,459 A | 3/1992 | Uljanic et al. |
| 5,123,044 A | 6/1992 | Tate |
| D328,280 S | 7/1992 | Lee |
| 5,167,522 A | 12/1992 | Behning |
| 5,175,873 A | 12/1992 | Goldenberg et al. |
| 5,177,515 A | 1/1993 | Tsukamoto |
| 5,219,067 A | 6/1993 | Lima et al. |
| 5,231,381 A | 7/1993 | Duwaer |
| 5,233,502 A | 8/1993 | Beatty et al. |
| 5,239,323 A | 8/1993 | Johnson |
| 5,239,324 A | 8/1993 | Ohmura et al. |
| 5,258,592 A | 11/1993 | Nishikawa et al. |
| 5,285,894 A | 2/1994 | Kamata et al. |
| 5,294,988 A | 3/1994 | Wakabayashi et al. |
| 5,305,032 A | 4/1994 | Arai |
| 5,336,896 A | 8/1994 | Katz |
| 5,360,108 A | 11/1994 | Alagia |
| 5,368,159 A | 11/1994 | Doria |
| 5,380,968 A | 1/1995 | Morse |
| 5,383,091 A | 1/1995 | Snell |
| 5,386,084 A | 1/1995 | Risko |
| 5,388,691 A | 2/1995 | White |
| 5,388,692 A | 2/1995 | Withrow et al. |
| 5,423,692 A | 6/1995 | Francis |
| D365,927 S | 1/1996 | Cho |
| 5,499,713 A | 3/1996 | Huffer |
| 5,505,328 A | 4/1996 | Stribiak |
| 5,508,479 A | 4/1996 | Schooley |
| 5,518,802 A | 5/1996 | Colvin et al. |
| 5,541,813 A | 7/1996 | Satoh et al. |
| RE35,318 E | 8/1996 | Warman |
| 5,548,306 A | 8/1996 | Yates et al. |
| 5,573,164 A | 11/1996 | Law |
| 5,583,742 A | 12/1996 | Noda et al. |
| 5,584,054 A | 12/1996 | Tyneski et al. |
| 5,586,002 A | 12/1996 | Notarianni |
| 5,586,176 A | 12/1996 | Peck |
| 5,590,760 A | 1/1997 | Astarb |
| 5,610,655 A | 3/1997 | Wakabayashi et al. |
| 5,613,237 A | 3/1997 | Bent et al. |
| D378,634 S | 4/1997 | LaPere |
| 5,632,373 A | 5/1997 | Kumar et al. |
| 5,636,101 A | 6/1997 | Bonsall et al. |
| 5,648,757 A | 7/1997 | Vernace et al. |
| 5,660,566 A | 8/1997 | Ohsumi |
| 5,669,004 A | 9/1997 | Sellers |
| 5,681,122 A | 10/1997 | Burke |
| 5,707,757 A | 1/1998 | Lee |
| 5,713,048 A | 1/1998 | Hayakawa |
| 5,713,466 A | 2/1998 | Tajima |
| 5,750,939 A * | 5/1998 | Makinwa ............... G06F 3/046 178/18.01 |
| D399,185 S | 10/1998 | Lin |
| 5,845,803 A | 12/1998 | Saito et al. |
| 5,850,915 A | 12/1998 | Tajima |
| 5,884,772 A | 3/1999 | Floyd et al. |
| 5,889,730 A | 3/1999 | May |
| 5,907,721 A | 5/1999 | Schelling et al. |
| 5,946,501 A | 8/1999 | Hayakawa |
| 5,950,816 A | 9/1999 | Reid |
| 5,956,291 A | 9/1999 | Nehemiah et al. |
| 5,982,520 A | 11/1999 | Weiser et al. |
| 5,990,874 A | 11/1999 | Tsumura et al. |
| 6,031,524 A | 2/2000 | Kunert |
| 6,041,924 A | 3/2000 | Tajima |
| 6,049,813 A | 4/2000 | Danielson et al. |
| D424,035 S | 5/2000 | Steiner et al. |
| 6,068,119 A | 5/2000 | Derr et al. |
| 6,073,770 A | 6/2000 | Park |
| 6,082,535 A | 7/2000 | Mitchell |
| 6,092,707 A | 7/2000 | Bowes |
| 6,094,785 A | 8/2000 | Montgomery et al. |
| 6,128,441 A | 10/2000 | Kamata et al. |
| 6,132,367 A | 10/2000 | Adair |
| 6,201,867 B1 | 3/2001 | Koike |
| 6,215,474 B1 | 4/2001 | Shah |
| 6,239,968 B1 | 5/2001 | Kim et al. |
| 6,273,252 B1 | 8/2001 | Mitchell |
| 6,274,826 B1 | 8/2001 | Serizawa et al. |
| 6,301,100 B1 | 10/2001 | Iwata |
| 6,304,459 B1 | 10/2001 | Toyosato et al. |
| 6,305,656 B1 | 10/2001 | Wemyss |
| 6,311,017 B1 | 10/2001 | Mori |
| 6,313,892 B2 | 11/2001 | Gleckman |
| 6,313,982 B1 | 11/2001 | Hino |
| 6,317,313 B1 | 11/2001 | Mosgrove et al. |
| 6,349,824 B1 | 2/2002 | Yamada |
| 6,353,529 B1 | 3/2002 | Cies |
| 6,375,009 B1 | 4/2002 | Lee |
| 6,388,877 B1 | 5/2002 | Canova et al. |
| 6,396,769 B1 | 5/2002 | Polany |
| 6,398,585 B1 | 6/2002 | Fukuda |
| 6,415,138 B2 | 7/2002 | Sirola et al. |
| 6,445,577 B1 | 9/2002 | Madsen et al. |
| 6,447,140 B1 | 9/2002 | Lu |
| 6,456,487 B1 | 9/2002 | Hetterick |
| 6,464,522 B2 | 10/2002 | Osawa et al. |
| 6,471,056 B1 | 10/2002 | Tzeng |
| 6,519,141 B2 | 2/2003 | Tseng et al. |
| 6,525,928 B1 | 2/2003 | Madsen et al. |
| 6,532,152 B1 | 3/2003 | White et al. |
| 6,536,589 B2 | 3/2003 | Chang |
| 6,571,056 B2 | 5/2003 | Shimamura et al. |
| D475,348 S | 6/2003 | Heiligenstein et al. |
| 6,574,434 B2 | 6/2003 | Matsuoto et al. |
| 6,594,472 B2 | 7/2003 | Curtis et al. |
| 6,595,608 B1 | 7/2003 | Minelli et al. |
| 6,597,865 B1 | 7/2003 | Negishi et al. |
| 6,614,423 B1 | 9/2003 | Wong et al. |
| 6,614,722 B2 | 9/2003 | Polany et al. |
| 6,616,111 B1 | 9/2003 | White |
| 6,617,973 B1 | 9/2003 | Osterman |
| 6,625,394 B2 | 9/2003 | Smith et al. |

(56) References Cited

U.S. PATENT DOCUMENTS

| | | | |
|---|---|---|---|
| 6,626,362 B1 | 9/2003 | Steiner et al. |
| 6,634,494 B1 | 10/2003 | Derr et al. |
| 6,636,697 B2 | 10/2003 | Smith et al. |
| 6,646,864 B2 | 11/2003 | Richardson |
| 6,659,274 B2 | 12/2003 | Enners |
| 6,665,174 B1 | 12/2003 | Derr et al. |
| 6,667,738 B2 | 12/2003 | Murphy |
| 6,669,017 B2 | 12/2003 | Linihan |
| 6,698,608 B2 | 3/2004 | Parker et al. |
| 6,701,159 B1 | 3/2004 | Powell |
| 6,721,651 B1 | 4/2004 | Minelli |
| 6,731,913 B2 | 5/2004 | Humphreys et al. |
| 6,739,759 B1 | 5/2004 | Seeley |
| 6,751,552 B1 | 6/2004 | Minelli |
| 6,760,570 B1 | 7/2004 | Higdon |
| 6,772,899 B2 | 8/2004 | Delmon |
| 6,778,388 B1 | 8/2004 | Minelli |
| 6,781,825 B2 | 8/2004 | Shih et al. |
| 6,785,566 B1 | 8/2004 | Irizarry |
| 6,819,549 B1 | 11/2004 | Lammers-Meis et al. |
| 6,819,866 B2 | 11/2004 | Silva |
| 6,822,161 B2 | 11/2004 | Komatsu et al. |
| 6,822,640 B2 | 11/2004 | Derocher |
| 6,839,430 B2 | 1/2005 | Kwak |
| 6,844,845 B1 | 1/2005 | Whiteside et al. |
| 6,848,930 B2 | 2/2005 | Fukuda |
| D507,268 S | 7/2005 | Schlieffers et al. |
| 6,913,201 B1 | 7/2005 | Wagner et al. |
| 6,914,774 B1 | 7/2005 | Albertini et al. |
| D507,871 S | 8/2005 | DiMarchi et al. |
| 6,929,141 B1 | 8/2005 | Minghetti |
| 6,953,126 B2 | 10/2005 | Parker et al. |
| 6,954,405 B2 | 10/2005 | Polany et al. |
| 6,955,293 B1 | 10/2005 | Katsanevas |
| 6,962,454 B1 | 11/2005 | Costello |
| 6,971,517 B2 | 12/2005 | Chen |
| 6,975,888 B2 | 12/2005 | Buesseler et al. |
| 6,980,777 B2 | 12/2005 | Shepherd et al. |
| 6,983,130 B2 | 1/2006 | Chien et al. |
| 6,987,527 B2 | 1/2006 | Kossin |
| 6,992,659 B2 | 1/2006 | Gettemy |
| 6,995,976 B2 | 2/2006 | Richardson |
| 7,025,274 B2 | 4/2006 | Solomon et al. |
| 7,033,215 B2 | 4/2006 | Kobayashi |
| 7,046,230 B2 | 5/2006 | Zadesky et al. |
| 7,048,561 B1 | 5/2006 | Elbaz |
| 7,050,712 B2 | 5/2006 | Shimamura |
| 7,050,841 B1 | 5/2006 | Onda |
| 7,054,441 B2 | 5/2006 | Pletikosa |
| 7,061,762 B2 | 6/2006 | Canova et al. |
| 7,069,063 B2 | 6/2006 | Halkosaari et al. |
| 7,072,467 B2 | 7/2006 | Ono |
| 7,082,264 B2 | 7/2006 | Watanabe et al. |
| 7,085,542 B2 | 8/2006 | Dietrich et al. |
| 7,089,547 B2 | 8/2006 | Goodman et al. |
| 7,106,959 B2 | 9/2006 | Sato |
| 7,146,701 B2 | 12/2006 | Mahoney et al. |
| 7,158,376 B2 | 1/2007 | Richardson et al. |
| 7,180,735 B2 | 2/2007 | Thomas et al. |
| 7,194,086 B2 | 3/2007 | Pletikosa |
| 7,194,202 B2 | 3/2007 | Funahashi et al. |
| 7,194,291 B2 | 3/2007 | Peng |
| D543,509 S | 5/2007 | Victor |
| 7,225,923 B2 | 6/2007 | Hallee et al. |
| 7,230,823 B2 | 6/2007 | Richardson et al. |
| 7,236,588 B2 | 6/2007 | Gartrell |
| 7,255,228 B2 | 8/2007 | Kim |
| 7,263,032 B2 | 8/2007 | Polany et al. |
| D550,623 S | 9/2007 | McCann |
| 7,290,654 B2 | 11/2007 | Hodges |
| 7,303,418 B2 | 12/2007 | O'Connor |
| 7,312,984 B2 | 12/2007 | Richardson et al. |
| 7,327,841 B2 | 2/2008 | Schreiber et al. |
| 7,341,144 B2 | 3/2008 | Tajiri et al. |
| 7,343,184 B2 | 3/2008 | Rostami |
| 7,352,961 B2 | 4/2008 | Watanabe et al. |
| 7,362,570 B2 | 4/2008 | Su |
| 7,365,281 B2 | 4/2008 | Yamaguchi et al. |
| 7,366,555 B2 | 4/2008 | Jokinen et al. |
| 7,369,881 B2 | 5/2008 | Tsujimoto |
| 7,389,869 B2 | 6/2008 | Mason |
| 7,400,917 B2 | 7/2008 | Wood et al. |
| D574,819 S | 8/2008 | Andre et al. |
| D575,056 S | 8/2008 | Tan |
| 7,409,148 B2 | 8/2008 | Takahashi et al. |
| 7,418,278 B2 | 8/2008 | Eriksson et al. |
| 7,428,427 B2 | 9/2008 | Brunstrom et al. |
| 7,436,653 B2 | 10/2008 | Yang et al. |
| 7,448,908 B2 | 11/2008 | Iwahori et al. |
| 7,449,650 B2 | 11/2008 | Richardson et al. |
| D582,149 S | 12/2008 | Tan |
| 7,464,813 B2 | 12/2008 | Carnevali |
| 7,464,814 B2 | 12/2008 | Carnevali |
| 7,495,659 B2 | 2/2009 | Marriott et al. |
| 7,495,895 B2 | 2/2009 | Carnevali |
| 7,499,040 B2 | 3/2009 | Zadesky et al. |
| 7,502,550 B2 | 3/2009 | Ariga |
| 7,511,956 B2 | 3/2009 | Tomioka et al. |
| 7,525,792 B2 | 4/2009 | Yokote |
| 7,535,799 B2 | 5/2009 | Polany et al. |
| D593,319 S | 6/2009 | Richardson et al. |
| 7,540,844 B2 | 6/2009 | Muser |
| 7,555,325 B2 | 6/2009 | Goros |
| 7,558,594 B2 | 7/2009 | Wilson |
| 7,594,576 B2 | 9/2009 | Chen et al. |
| 7,609,512 B2 | 10/2009 | Richardson et al. |
| 7,613,386 B2 | 11/2009 | Shimamura |
| 7,623,898 B2 | 11/2009 | Holmberg |
| D605,850 S | 12/2009 | Richardson et al. |
| 7,630,746 B2 | 12/2009 | Holmberg |
| 7,653,292 B2 | 1/2010 | Yamaguchi et al. |
| 7,663,878 B2 | 2/2010 | Swan et al. |
| 7,663,879 B2 | 2/2010 | Richardson et al. |
| 7,668,580 B2 | 2/2010 | Shin et al. |
| 7,679,674 B2 | 3/2010 | Nishizawa |
| 7,688,580 B2 | 3/2010 | Richardson et al. |
| 7,697,269 B2 | 4/2010 | Yang et al. |
| D616,430 S | 5/2010 | Fathollahi |
| 7,711,400 B2 | 5/2010 | Nuovo |
| 7,733,642 B2 | 6/2010 | Liou et al. |
| 7,755,975 B2 | 7/2010 | Pettersen et al. |
| 7,772,507 B2 | 8/2010 | Orr et al. |
| 7,775,354 B2 | 8/2010 | Latchford et al. |
| 7,787,756 B2 | 8/2010 | Funahashi et al. |
| 7,789,228 B2 | 9/2010 | Zenzai |
| 7,789,696 B2 | 9/2010 | Umei et al. |
| 7,801,425 B2 | 9/2010 | Fantone et al. |
| 7,850,032 B2 | 12/2010 | Carnevali et al. |
| 7,854,434 B2 | 12/2010 | Heiman et al. |
| 7,889,489 B2 * | 2/2011 | Richardson ............ G06F 1/1626 206/305 |
| 7,907,394 B2 * | 3/2011 | Richardson ............ G06F 1/1613 312/223.1 |
| 7,926,818 B2 | 4/2011 | Isono |
| 7,933,122 B2 | 4/2011 | Richardson et al. |
| 7,936,566 B2 | 5/2011 | Shigyo et al. |
| 7,941,196 B2 | 5/2011 | Kawasaki et al. |
| 7,944,697 B2 | 5/2011 | Hata et al. |
| 7,975,870 B2 | 7/2011 | Laule et al. |
| 7,978,092 B2 | 7/2011 | Osaka |
| 7,988,468 B2 | 8/2011 | Yang et al. |
| 7,993,071 B2 | 8/2011 | Clawson |
| 8,004,835 B2 | 8/2011 | Conti et al. |
| 8,014,134 B2 | 9/2011 | Liu et al. |
| 8,024,015 B2 | 9/2011 | Araki et al. |
| 8,031,472 B2 | 10/2011 | Bicket et al. |
| 8,032,194 B2 | 10/2011 | Liu et al. |
| 8,050,022 B2 | 11/2011 | McIntyre |
| 8,053,668 B2 | 11/2011 | Lai et al. |
| 8,068,331 B2 | 11/2011 | Sauers et al. |
| 8,089,757 B2 | 1/2012 | Chen et al. |
| 8,101,859 B2 | 1/2012 | Zadesky |
| 8,138,434 B2 | 3/2012 | Tang et al. |
| 8,164,899 B2 | 4/2012 | Yamaguchi et al. |

(56) References Cited

U.S. PATENT DOCUMENTS

| | | |
|---|---|---|
| 8,167,126 B2 | 5/2012 | Stiehl |
| 8,191,706 B1 | 6/2012 | Liu |
| 8,204,561 B2 | 6/2012 | Mongan et al. |
| 8,210,859 B2 | 7/2012 | Tiberghien et al. |
| 8,223,997 B2 | 7/2012 | Wilson, II et al. |
| 8,245,842 B2 | 8/2012 | Bau |
| 8,251,210 B2 | 8/2012 | Schmidt et al. |
| 8,265,264 B2 | 9/2012 | Yamaguchi et al. |
| 8,269,104 B2 | 9/2012 | Choraku et al. |
| 8,286,789 B2 | 10/2012 | Wilson et al. |
| 8,295,043 B2 | 10/2012 | Tai et al. |
| 8,311,595 B2 | 11/2012 | Takatsuka et al. |
| 8,342,325 B2 | 1/2013 | Rayner |
| 8,373,980 B2 | 2/2013 | Reber |
| 8,393,466 B2 | 3/2013 | Rayner |
| 8,400,408 B2 | 3/2013 | Hotelling et al. |
| 8,430,240 B2 | 4/2013 | Kim |
| D682,817 S | 5/2013 | Murchison et al. |
| 8,454,101 B2 | 6/2013 | Kuo |
| 8,499,933 B2 | 8/2013 | Ziemba |
| 8,520,373 B2 | 8/2013 | Liu |
| 8,526,180 B2 | 9/2013 | Rayner |
| 8,531,824 B2 | 9/2013 | Rayner |
| 8,531,834 B2 | 9/2013 | Rayner |
| 8,548,541 B2 | 10/2013 | Rayner |
| 8,564,950 B2 | 10/2013 | Rayner |
| 8,570,737 B2 | 10/2013 | Rayner |
| 8,584,847 B2 | 11/2013 | Tages et al. |
| 8,599,547 B2 | 12/2013 | Richardson et al. |
| 8,611,969 B2 | 12/2013 | Smith et al. |
| 8,708,142 B2 | 4/2014 | Rayner |
| 8,798,675 B2 | 8/2014 | Salmon et al. |
| 8,833,379 B1 | 9/2014 | Kaplan |
| 8,995,126 B2 | 3/2015 | Rayner |
| 9,025,317 B2 | 5/2015 | Richardson et al. |
| 9,232,670 B2 | 1/2016 | Pakula et al. |
| 2001/0040109 A1 | 11/2001 | Yaski et al. |
| 2002/0003584 A1 | 1/2002 | Kossin |
| 2002/0009195 A1 | 1/2002 | Schon |
| 2002/0065054 A1 | 5/2002 | Humphreys et al. |
| 2002/0071550 A1 | 6/2002 | Pletikosa |
| 2002/0079244 A1 | 6/2002 | Kwong |
| 2002/0085342 A1 | 7/2002 | Chen et al. |
| 2002/0085709 A1 | 7/2002 | Hsu |
| 2002/0086702 A1 | 7/2002 | Lai et al. |
| 2002/0090212 A1 | 7/2002 | Shimamura et al. |
| 2002/0101707 A1 | 8/2002 | Canova et al. |
| 2002/0122353 A1 | 9/2002 | Polany et al. |
| 2002/0136557 A1 | 9/2002 | Shimamura |
| 2002/0137475 A1 | 9/2002 | Shou et al. |
| 2002/0175096 A1 | 11/2002 | Linihan |
| 2002/0175901 A1 | 11/2002 | Gettemy |
| 2002/0193136 A1 | 12/2002 | Halkosaari et al. |
| 2002/0195910 A1 | 12/2002 | Hus et al. |
| 2003/0080947 A1 | 5/2003 | Genest et al. |
| 2003/0095374 A1 | 5/2003 | Richardson |
| 2003/0103624 A1 | 6/2003 | Hu |
| 2003/0111366 A1 | 6/2003 | Enners |
| 2003/0118332 A1 | 6/2003 | Smith et al. |
| 2003/0118334 A1 | 6/2003 | Smith et al. |
| 2003/0128397 A1 | 7/2003 | Smith et al. |
| 2003/0151890 A1 | 8/2003 | Huang et al. |
| 2003/0223577 A1 | 12/2003 | Ono |
| 2004/0014506 A1 | 1/2004 | Kemppinen |
| 2004/0076415 A1 | 4/2004 | Silva |
| 2004/0089570 A1 | 5/2004 | Chien et al. |
| 2004/0120219 A1 | 6/2004 | Polany et al. |
| 2004/0121226 A1 | 6/2004 | Kaelin et al. |
| 2004/0188120 A1 | 9/2004 | Komatsu et al. |
| 2004/0195783 A1 | 10/2004 | Akagi et al. |
| 2004/0203502 A1 | 10/2004 | Dietrich et al. |
| 2004/0226836 A1 | 11/2004 | Schreiber et al. |
| 2005/0052425 A1 | 3/2005 | Zadesky et al. |
| 2005/0057534 A1* | 3/2005 | Charlier ............... G06F 3/0312 |
| | | 345/179 |
| 2005/0094024 A1 | 5/2005 | Sato |
| 2005/0110768 A1 | 5/2005 | Marriott et al. |
| 2005/0115852 A1 | 6/2005 | Funahashi et al. |
| 2005/0123161 A1 | 6/2005 | Polany et al. |
| 2005/0139498 A1 | 6/2005 | Goros |
| 2005/0167304 A1 | 8/2005 | Shimamura |
| 2005/0174727 A1 | 8/2005 | Thomas et al. |
| 2005/0181843 A1 | 8/2005 | Tsujimoto |
| 2005/0224508 A1 | 10/2005 | Tajiri et al. |
| 2005/0247584 A1 | 11/2005 | Lu |
| 2005/0279655 A1 | 12/2005 | Chen |
| 2005/0279661 A1 | 12/2005 | Hodges |
| 2006/0008261 A1 | 1/2006 | Watanabe et al. |
| 2006/0028458 A1* | 2/2006 | King ..................... G02B 26/06 |
| | | 345/179 |
| 2006/0110146 A1 | 5/2006 | Ariga |
| 2006/0255493 A1 | 11/2006 | Fouladpour |
| 2006/0274493 A1 | 12/2006 | Richardson et al. |
| 2006/0279924 A1 | 12/2006 | Richardson et al. |
| 2007/0040931 A1 | 2/2007 | Nishizawa |
| 2007/0071423 A1 | 3/2007 | Fantone et al. |
| 2007/0074473 A1 | 4/2007 | Yamaguchi et al. |
| 2007/0086273 A1 | 4/2007 | Polany et al. |
| 2007/0109730 A1 | 5/2007 | Shigyo et al. |
| 2007/0110416 A1 | 5/2007 | Yamaguchi et al. |
| 2007/0115387 A1 | 5/2007 | Ho |
| 2007/0138920 A1 | 6/2007 | Austin et al. |
| 2007/0139873 A1 | 6/2007 | Thomas et al. |
| 2007/0146985 A1 | 6/2007 | Mick et al. |
| 2007/0158220 A1 | 7/2007 | Cleereman et al. |
| 2007/0215663 A1 | 9/2007 | Chongson et al. |
| 2007/0241012 A1 | 10/2007 | Latchford et al. |
| 2007/0261976 A1 | 11/2007 | Anderson |
| 2007/0261978 A1 | 11/2007 | Sanderson |
| 2007/0280053 A1 | 12/2007 | Polany et al. |
| 2007/0297149 A1 | 12/2007 | Richardson et al. |
| 2008/0039161 A1 | 2/2008 | Chan |
| 2008/0055258 A1* | 3/2008 | Sauers ................... G06F 1/1626 |
| | | 345/173 |
| 2008/0081679 A1 | 4/2008 | Kawasaki et al. |
| 2008/0157485 A1 | 7/2008 | Isono |
| 2008/0163463 A1 | 7/2008 | Hulden |
| 2008/0164267 A1 | 7/2008 | Huber |
| 2008/0171456 A1 | 7/2008 | Vanzo |
| 2008/0316687 A1 | 12/2008 | Richardson et al. |
| 2009/0005136 A1 | 1/2009 | Hutzel et al. |
| 2009/0009945 A1 | 1/2009 | Johnson et al. |
| 2009/0017884 A1 | 1/2009 | Rotschild |
| 2009/0028535 A1 | 1/2009 | Funahashi et al. |
| 2009/0032420 A1 | 2/2009 | Zenzai |
| 2009/0034169 A1 | 2/2009 | Richardson et al. |
| 2009/0080153 A1 | 3/2009 | Richardson et al. |
| 2009/0087655 A1 | 4/2009 | Yamada et al. |
| 2009/0090532 A1 | 4/2009 | Lai et al. |
| 2009/0109635 A1 | 4/2009 | Chen et al. |
| 2009/0111543 A1 | 4/2009 | Tai et al. |
| 2009/0113758 A1 | 5/2009 | Nishiwaki et al. |
| 2009/0117957 A1 | 5/2009 | Araki et al. |
| 2009/0167545 A1 | 7/2009 | Osaka |
| 2009/0211775 A1 | 8/2009 | Yamaguchi et al. |
| 2009/0215412 A1 | 8/2009 | Liu et al. |
| 2009/0260844 A1 | 10/2009 | Tseng |
| 2009/0283184 A1 | 11/2009 | Han |
| 2010/0006314 A1 | 1/2010 | Wilson, II et al. |
| 2010/0020393 A1 | 1/2010 | Mazzio |
| 2010/0044198 A1 | 2/2010 | Tang et al. |
| 2010/0053355 A1 | 3/2010 | Iwase et al. |
| 2010/0085691 A1 | 4/2010 | Yeh et al. |
| 2010/0093412 A1 | 4/2010 | Serra et al. |
| 2010/0096284 A1 | 4/2010 | Bau |
| 2010/0104814 A1 | 4/2010 | Richardson et al. |
| 2010/0144194 A1 | 6/2010 | Umei et al. |
| 2010/0147737 A1 | 6/2010 | Richardson et al. |
| 2010/0181108 A1 | 7/2010 | Hata et al. |
| 2010/0200456 A1 | 8/2010 | Parkinson |
| 2010/0203931 A1 | 8/2010 | Hynecek et al. |
| 2010/0206601 A1 | 8/2010 | Choraku et al. |
| 2010/0238119 A1 | 9/2010 | Dubrovsky et al. |
| 2010/0251827 A1 | 10/2010 | Bourbeau et al. |

(56) References Cited

U.S. PATENT DOCUMENTS

| | | |
|---|---|---|
| 2010/0252337 A1* | 10/2010 | Yang ............... G06F 3/03545 178/19.01 |
| 2010/0311475 A1 | 12/2010 | Takatsuka et al. |
| 2010/0313485 A1 | 12/2010 | Kuo |
| 2011/0002106 A1 | 1/2011 | Bentley et al. |
| 2011/0017620 A1 | 1/2011 | Latchford et al. |
| 2011/0024315 A1 | 2/2011 | Kim |
| 2011/0073608 A1 | 3/2011 | Richardson et al. |
| 2011/0157055 A1 | 6/2011 | Tilley et al. |
| 2011/0157800 A1 | 6/2011 | Richardson et al. |
| 2011/0228460 A1 | 9/2011 | Kim et al. |
| 2011/0234547 A1* | 9/2011 | Liang ............... G06F 3/03545 345/179 |
| 2011/0234548 A1* | 9/2011 | Liang ............... G06F 3/03545 345/179 |
| 2011/0299241 A1* | 12/2011 | Chen ............... G06F 1/1628 361/679.55 |
| 2011/0300730 A1 | 12/2011 | Someya |
| 2011/0300731 A1 | 12/2011 | Nakamura |
| 2012/0018325 A1 | 1/2012 | Kim |
| 2012/0031914 A1 | 2/2012 | Liu |
| 2012/0043235 A1 | 2/2012 | Klement |
| 2012/0099261 A1 | 4/2012 | Reber |
| 2012/0099262 A1 | 4/2012 | Reber et al. |
| 2012/0099265 A1 | 4/2012 | Reber |
| 2012/0099266 A1 | 4/2012 | Reber et al. |
| 2012/0100737 A1 | 4/2012 | Frey |
| 2012/0103844 A1 | 5/2012 | Piedra et al. |
| 2012/0118773 A1 | 5/2012 | Rayner |
| 2012/0168336 A1 | 7/2012 | Schmidt et al. |
| 2012/0196464 A1 | 8/2012 | Lu |
| 2012/0211382 A1 | 8/2012 | Rayner |
| 2012/0261289 A1 | 10/2012 | Wyner et al. |
| 2012/0314354 A1 | 12/2012 | Rayner |
| 2013/0027862 A1 | 1/2013 | Rayner |
| 2013/0043777 A1 | 2/2013 | Rayner |
| 2013/0077226 A1 | 3/2013 | Rayner |
| 2013/0084728 A1 | 4/2013 | Omae et al. |
| 2013/0088130 A1 | 4/2013 | Rayner |
| 2013/0088813 A1 | 4/2013 | Su et al. |
| 2013/0092576 A1 | 4/2013 | Rayner |
| 2013/0098788 A1 | 4/2013 | McCarville et al. |
| 2013/0182881 A1 | 7/2013 | Horino et al. |
| 2013/0220841 A1 | 8/2013 | Yang |
| 2013/0224993 A1 | 8/2013 | Purdy |
| 2013/0242481 A1 | 9/2013 | Kim et al. |
| 2013/0334072 A1 | 12/2013 | Rayner |
| 2014/0038443 A1 | 2/2014 | Campbell et al. |
| 2014/0065847 A1 | 3/2014 | Salmon et al. |
| 2014/0099153 A1* | 4/2014 | Pemberton-Pigott .. B43K 23/12 401/195 |
| 2014/0099526 A1 | 4/2014 | Powell et al. |
| 2014/0187289 A1 | 7/2014 | Cataldo et al. |
| 2014/0213088 A1 | 7/2014 | Furuya et al. |
| 2014/0228074 A1 | 8/2014 | Kulkarni et al. |
| 2014/0248787 A1 | 9/2014 | Suzuki et al. |
| 2014/0262848 A1 | 9/2014 | Fathollahi et al. |
| 2014/0274232 A1 | 9/2014 | Tages |
| 2015/0022503 A1* | 1/2015 | Chang ............... G06F 3/03545 345/179 |
| 2015/0277508 A1* | 10/2015 | McCracken ......... G06F 1/1626 361/679.3 |
| 2016/0056648 A1* | 2/2016 | Dowd ............... H02J 7/0042 320/107 |

FOREIGN PATENT DOCUMENTS

| | | |
|---|---|---|
| EP | 2129202 A2 | 12/2009 |
| JP | 2000125916 A | 5/2000 |
| JP | 200161530 | 3/2001 |
| JP | 2002280757 A | 9/2002 |
| JP | 2005129807 A | 5/2005 |
| WO | 9400037 A1 | 1/1994 |
| WO | 2012174175 | 12/2012 |
| WO | 2013096927 | 6/2013 |

* cited by examiner

PROTECTIVE CASE WITH STYLUS ACCESS FEATURE

CROSS-REFERENCE TO RELATED APPLICATIONS

This application claims priority to U.S. Provisional Patent Application No. 62/167,223, filed May 27, 2015, which is hereby incorporated by reference in its entirety.

FIELD

This disclosure relates generally to cases, covers, shells, and enclosures for electronic devices that include a stylus.

BACKGROUND

Portable electronic devices are commonly used for communication, entertainment, and/or information purposes. Portable electronic devices include devices such as smartphones, cellular phones, mobile communication devices, computers, portable computing devices, mobile computing devices, tablet computers, cameras, video players, audio players, electronic media readers, two-way radios, global positioning satellite (GPS) devices, and/or other types of electronic computing or communication devices, including combinations thereof. Tablet computers and large smartphones often include stylus that can be utilized to interact with the display of the device. A stylus can be made of plastic, metal, or some other rigid or semi-rigid material in the shape of a writing utensil, allowing a user to interact with the display of the device in a more accurate manner than simply using a finger. A stylus can be electronically passive, or it can contain electronics, magnets, and sensors to allow a more accurate and flexible interaction with the device display. For example, the SAMSUNG® NOTE 4 device includes stylus that contains electronics and pressure sensors, and is stored in the housing of the device. The stylus includes a magnet that interacts with the device via a sensor, such as a Hall effect sensor, that allows the device to detect when the stylus is inserted and removed from the device housing.

Portable electronic devices are used in a wide variety of environments that can subject the sensitive components to damage from shock, vibration, impact, external forces, sharp objects, water, dirt, dust, snow, rain, sweat, chemicals, and/or other damaging elements. Protection of an electronic device from water and other liquids while allowing a user to easily access and use an associated stylus is desirable.

SUMMARY

In one aspect, the disclosure provides a stylus for use with a portable electronic device encased in a waterproof protective shell. The portable electronic device has a housing with an aperture and slot to receive and store the stylus. When the portable electronic device is encased in the waterproof protective shell, the slot of the housing aligns with an aperture in the protective shell, such that the stylus can be inserted through the shell and into the slot of the housing. The stylus includes a first end portion, a middle portion, a second end portion, and a cap portion that is part of the second end portion. The cap portion has an outer surface that interacts with an inner surface of the aperture of the protective shell that can retain and release the cap portion. The stylus is longer than a length of the slot in the portable electronic device housing so that when the electronic device is installed in the shell, the stylus extends at least about 90% of the length of the slot, and the cap portion seals the aperture of the shell.

In another aspect, the disclosure provides a protective encasement for a portable electronic device. The portable electronic device has a housing with an aperture and a storage area within the housing for storing a stylus. The protective encasement includes a waterproof shell and a removable cap. The waterproof shell at least partially encloses the portable electronic device and includes an aperture aligned with the storage area of the housing to receive the stylus. The removable cap allows the stylus to be inserted through the shell aperture into the storage area of the housing such that the stylus extends at least about 90% of a length of the cavity. The removable cap also permits the stylus to be removed from the shell aperture when the stylus is inserted at least about 90% of the length of the storage area. The removable cap includes an outer surface that interacts with an inner surface of the aperture to retain the removable cap in the aperture and form a seal, as well as allow the removable cap to be released from the shell aperture. The removable cap also includes a perimeter portion defining a cavity having an inner surface that interacts with an end of the stylus to retain and release an end of the stylus.

In yet another aspect, the disclosure provides a protective encasement for a portable electronic device having a housing with an aperture and a receptacle within the housing for storing a stylus. The protective encasement includes a waterproof shell that at least partially encases the portable electronic device, and a removable cap that can cover an aperture in the shell. The aperture is aligned with the receptacle of the housing to allow insertion of the stylus through the shell and into the receptacle of the housing. The removable cap permits the stylus to be inserted through the waterproof shell aperture into the receptacle of the housing such that the stylus extends at least about 90% of a length of the receptacle. The removable cap also permits the stylus to be removed from the waterproof shell aperture when the stylus is inserted at least about 90% of the length of the receptacle. The removable cap includes an outer surface that interacts with an inner surface of the aperture to retain the removable cap in the aperture and form a seal, as well as allow the removable cap to be released from the shell aperture. The removable cap also includes an extended arm having one or more securing elements to allow the cap to push and pull the stylus when the stylus is inserted into and removed from the waterproof shell and the receptacle of the housing. The one or more securing elements interact with at least one corresponding stylus securing element on the outer surface of the stylus.

The summary of the invention described above is non-limiting and other features and advantages of the invention will be apparent from the following detailed description of the invention, and from the claims.

BRIEF DESCRIPTION OF THE FIGURES

Embodiments of the present technology are described and explained using the accompanying drawings summarized below.

DETAILED DESCRIPTION

The present disclosure is directed to shells and encasements for portable electronic devices that include a stylus and display. The shells and encasements secure the device and the stylus while allowing access to the stylus of the electronic device.

Figure 1:
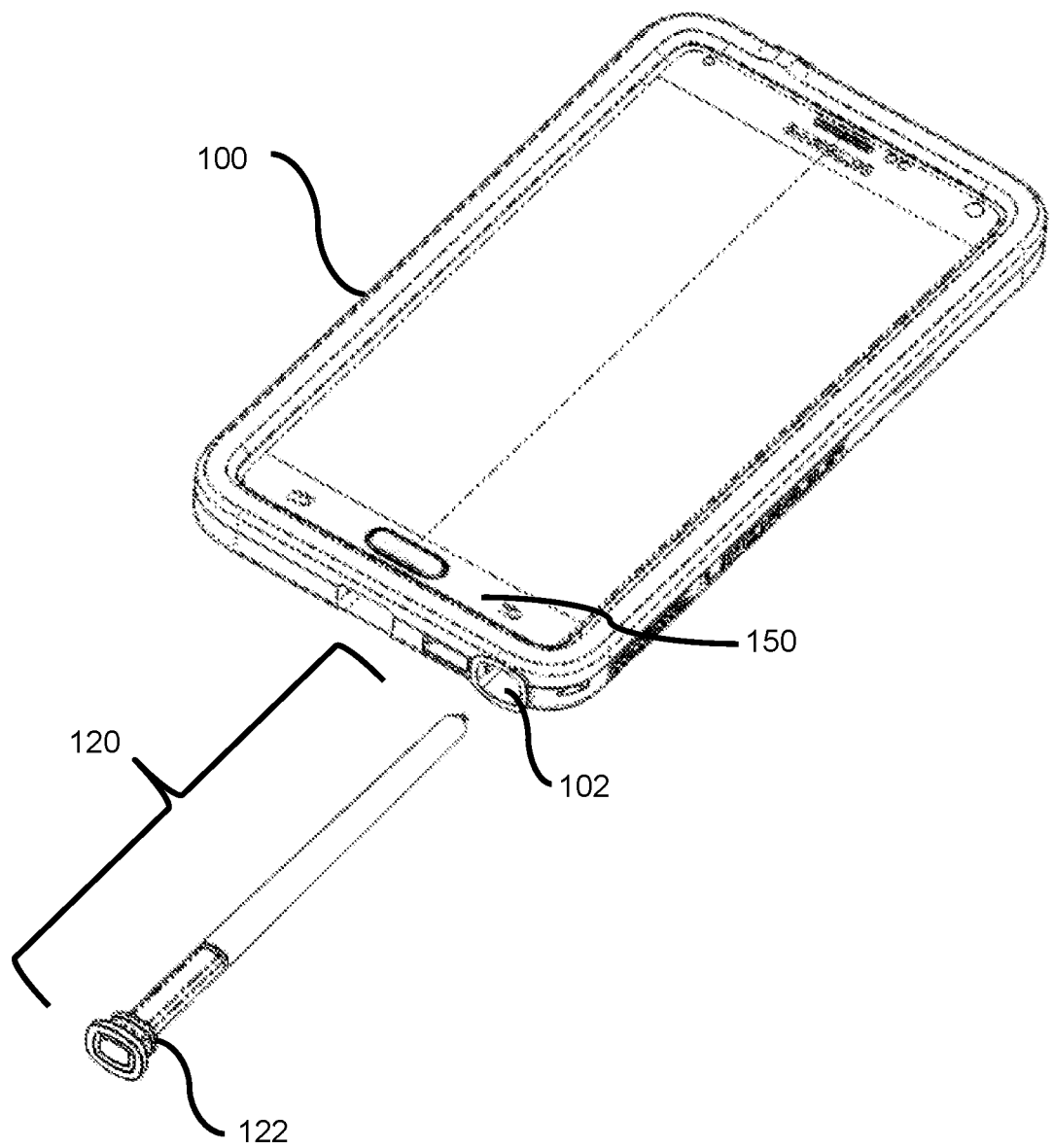
FIG. 1 illustrates a perspective view of a portable electronic device installed in a shell and a stylus with a cap portion aligned in front of an aperture in the shell.

FIG. 1 shows an exemplary shell and stylus, with portable electronic device 150 installed in shell 100. Stylus 120 has cap portion 122 that is configured to interact with aperture 102 in shell 100 to form a seal. The housing of portable electronic device 150 also includes an aperture and a slot (not visible in FIG. 1) into which a stylus can be inserted and stored. Stylus 120 replaces the stylus normally used with portable electronic device 150, and can be longer than the normal stylus. The additional length of stylus 120 can account for the thickness of shell 100 where aperture 102 aligns with the slot in the electronic device housing, and can allow stylus 120 to extend at least about 90% of the length of the slot in the electronic device housing. The additional length of the stylus can be important if the standard stylus utilizes a magnet or a sensor to interact with the electronic device when inserted into the electronic device housing. For example, the stylus of the SAMSUNG® GALAXY NOTE 4 includes a magnet near one end of the stylus. When the stylus is inserted into a slot in the housing of the device, the magnet interacts with a Hall effect sensor that recognizes the proximity of the magnet and signals the presence of the stylus to the electronic device. In such instances, stylus 120 can be longer than that the standard stylus and include a similar magnet, such that stylus 120 mimics the functionality of the standard stylus. In instances of stylus 120 that includes a magnet or sensor for interaction with the electronic device, the position of the magnet or sensor in stylus 120 can be configured such that when stylus 120 is inserted through aperture 102 and into the aperture of portable electronic device 150, the magnet or sensor is proximate enough to the corresponding sensor of the electronic device for the corresponding electronic device sensor to detect the magnet or sensor of stylus 120.

Figure 2:
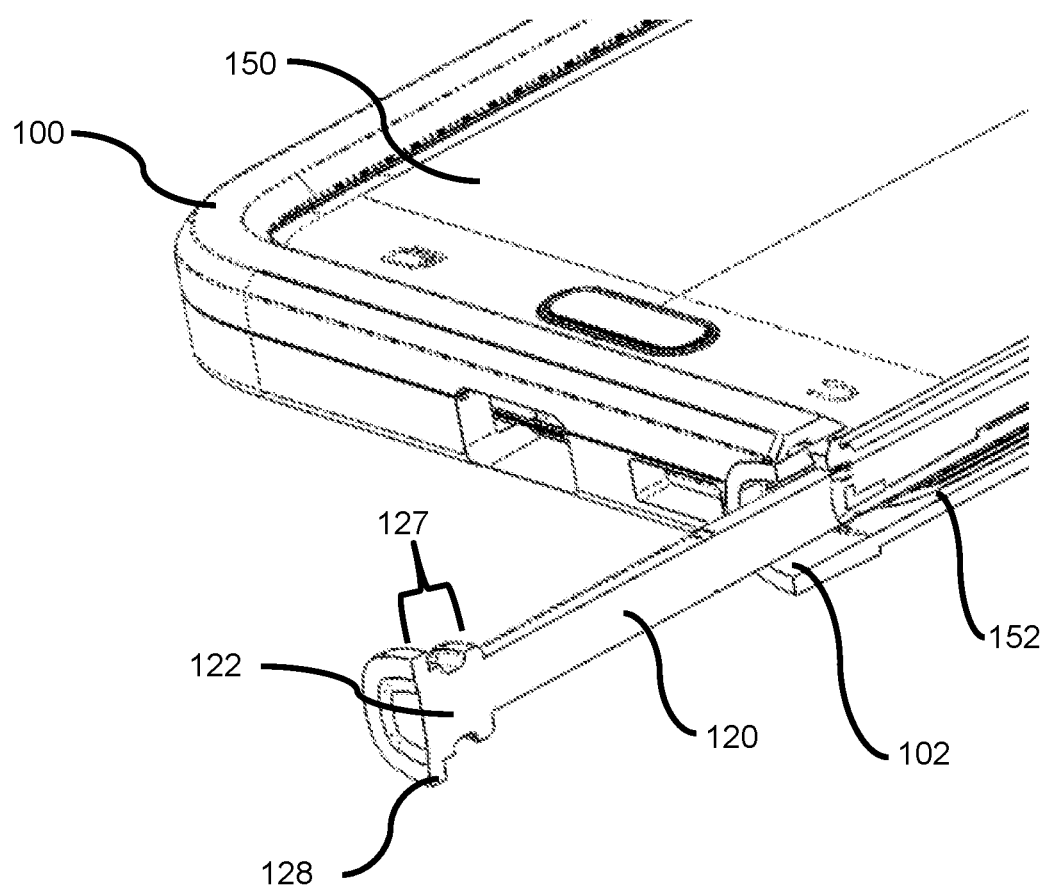
FIG. 2 shows a perspective sectional view of a stylus partially inserted into a shell and a portable electronic device.

FIG. 2 shows a perspective sectional view of stylus 120 partially inserted through aperture 102 and into slot 152 of portable electronic device 150. Cap portion 122 is depicted as being contiguous with stylus 120, however, in some embodiments, cap portion 122 can be adhered or molded to stylus 120. Cap portion 122 can be formed from a flexible or semi-rigid elastomer. The stylus can have any cross-sectional geometry, such as round, oval, triangular, square, pentagonal, hexagonal, etc. The cross-sectional geometry of cap portion 122 can be the same as or different from that of the rest of stylus 120. Cap portion 122 also includes outer lip 128 to further facilitate sealing shell aperture 102 of shell 100 and provide additional area for exerting force against cap portion 122.

Figure 3:
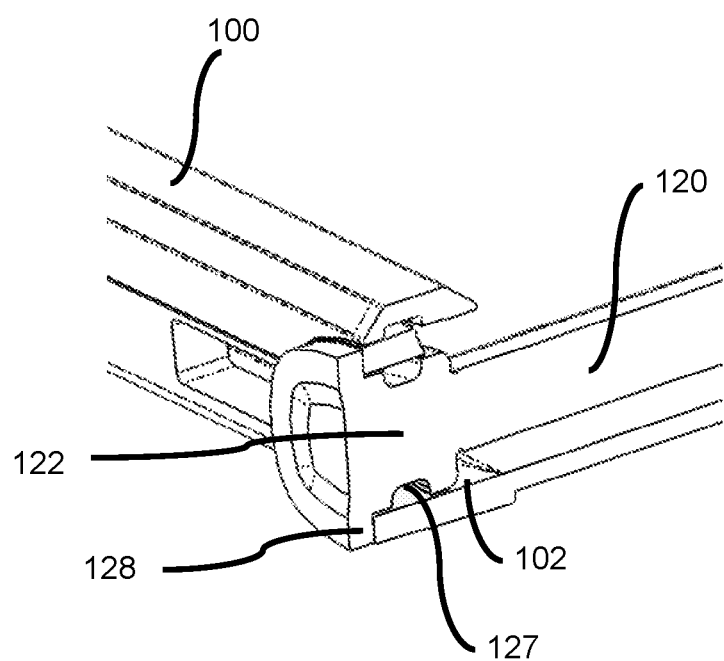
FIG. 3 illustrates a perspective sectional view of a stylus completely inserted into a shell and portable electronic device.

FIG. 3 shows a perspective sectional view of stylus 120 completely inserted through aperture 102 such that the outer surface of cap portion 122 is in contact with the inner surface of aperture 102 to form a seal. In some embodiments, the seal can be water resistant. Cap portion 122 also includes groove 127 that can hold a gasket (not shown) to form the seal against the inner surface of aperture 102. The gasket can be separately molded and installed, overmolded directly into groove 127, or dispensed into groove 127. In some embodiments, cap portion 122 can be molded from a flexible elastomer and utilize a flexible gasket contiguous with the outer surface for interacting with the inner surface of aperture 102 to form the seal.

Figure 4:
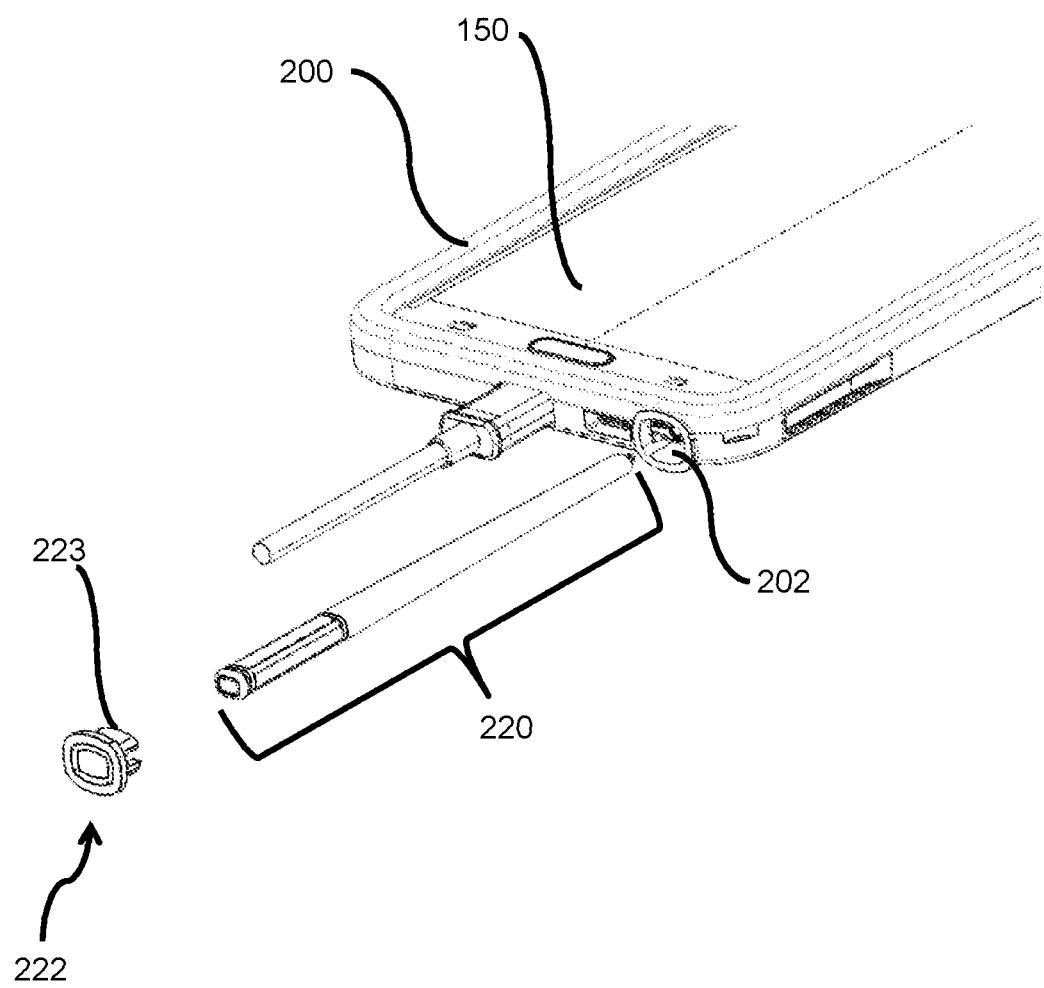
FIG. 4 illustrates a perspective view of a portable electronic device installed in a shell and a stylus with a removable cap that is removed from the end of the stylus.
Figure 5:
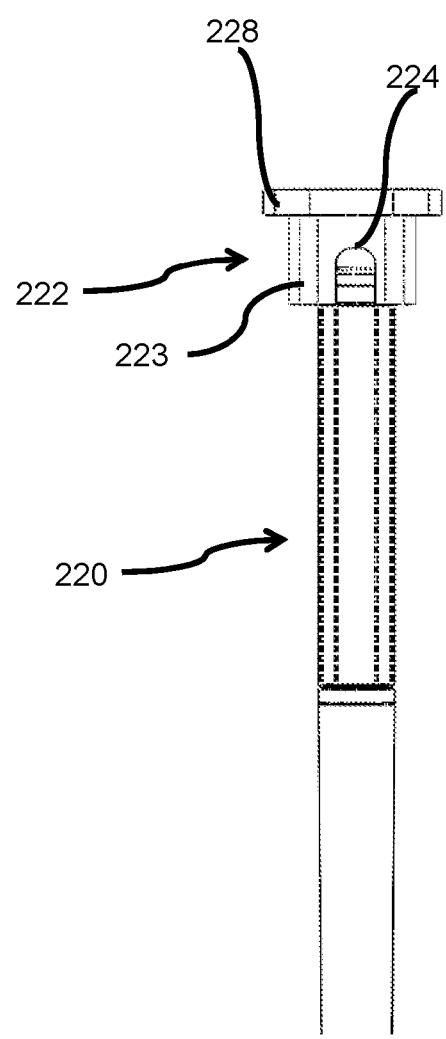
FIG. 5 shows a side view of a stylus and a removable cap attached to an end of the stylus.

FIG. 4 shows a perspective view of portable electronic device 150 installed in another embodiment of shell 200, as well as stylus 220 and removable cap 222 removed from the end of stylus 220. Removable cap 222 has perimeter portion 223 defining a cavity (not visible in FIG. 4; see FIG. 6). A side view of stylus 220 and installed removable cap 222 is depicted in FIG. 5. In the embodiment shown, removable cap 222 includes gap 224 in perimeter portion 223 to allow additional flexibility of the cap, thereby aiding installation of removable cap 222 onto the end of stylus 220. In some embodiments, perimeter portion 223 can have more than one gap, or no gap at all. Removable cap 222 can be formed of a rigid, semi-rigid, or flexible material, such as a plastic or elastomer. Removable cap 222 also includes outer lip 228 to further facilitate sealing of shell aperture 202 and provide additional area for exerting force against removable cap 222.

Figure 6:
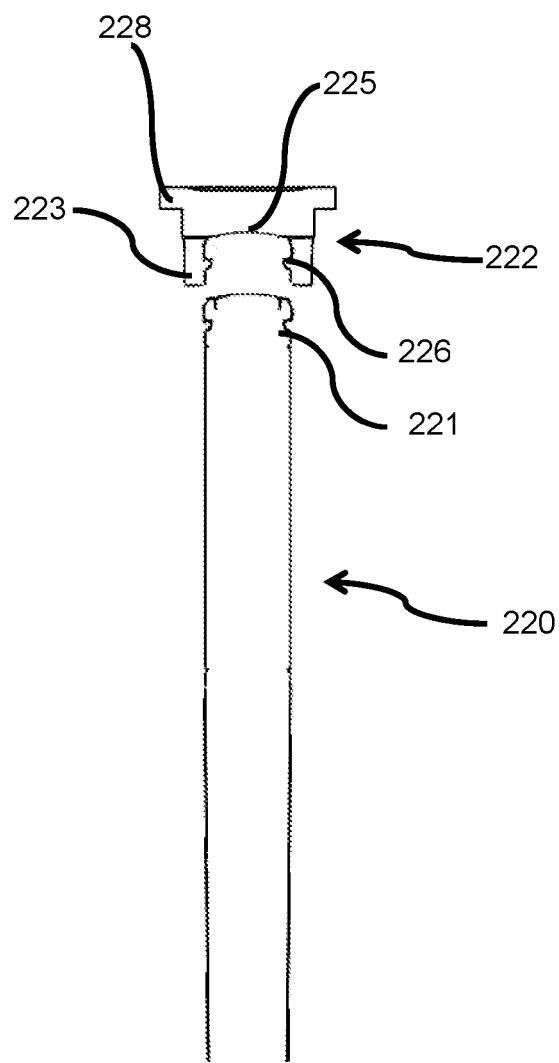
FIG. 6 shows a side sectional view of a stylus and a removable cap.

FIG. 6 shows an exploded sectional view of stylus 220 with removable cap 222. The inner surface of cavity 225 of removable cap 222 includes inner cap retention element 226, configured here as a protrusion that interacts with a corresponding stylus retention element 221, configured as a groove on an outer surface of stylus 220. When the end of stylus 220 is inserted into cavity 225, inner cap retention element 226 contacts stylus retention element 221 to retain removable cap 222. In some embodiments, stylus 220 and removable cap 222 can include more than one inner cap retention elements and more than one stylus retention elements. In some embodiments, inner cap retention element 226 can be a groove and stylus retention element 221 can be a corresponding protrusion. In certain instances, stylus 220 can have a plurality of inner cap retention elements and stylus retention elements including a mixture of grooves and protrusions.

Figure 7:
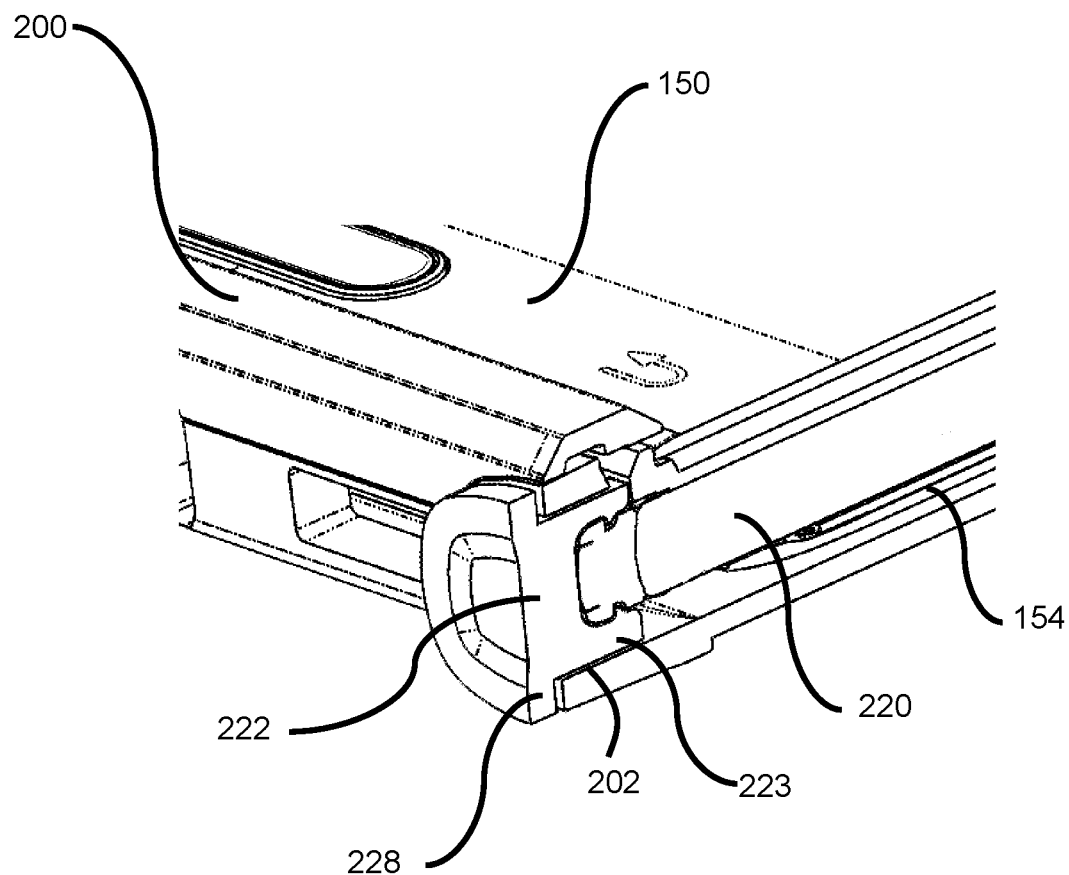
FIG. 7 shows a perspective sectional view of a stylus and removable cap inserted into an aperture of a shell.

FIG. 7 illustrates a perspective sectional view of stylus 220 and removable cap 222 fully inserted into shell 200 and portable electronic device 150. The outer surface of perimeter portion 223 contacts the inner surface of aperture 202 and seals aperture 202 against intrusion by water and particulates. In certain embodiments, the seal can be water resistant. In some embodiments, the outer surface of removable cap 222 can include one or more flexible protrusions that seal against the inner surface of aperture 202. In some instances, removable cap 222 can include a channel and a gasket that seal against the inner surface of aperture 202.

Certain instances of a removable cap can include one or more outer cap retention elements (e.g. grooves and/or protrusions) that interface with corresponding aperture retention elements (e.g. grooves and/or protrusions) on the inner surface of aperture 202.

In some embodiments, a tether can connect removable cap 222 with shell 200, to prevent loss of removable cap 222. The tether can be formed from plastic or an elastomer, and can be flexible, semi-rigid, or rigid. An exemplary tether is further described below and is shown in FIGS. 8-10.

Figure 8:
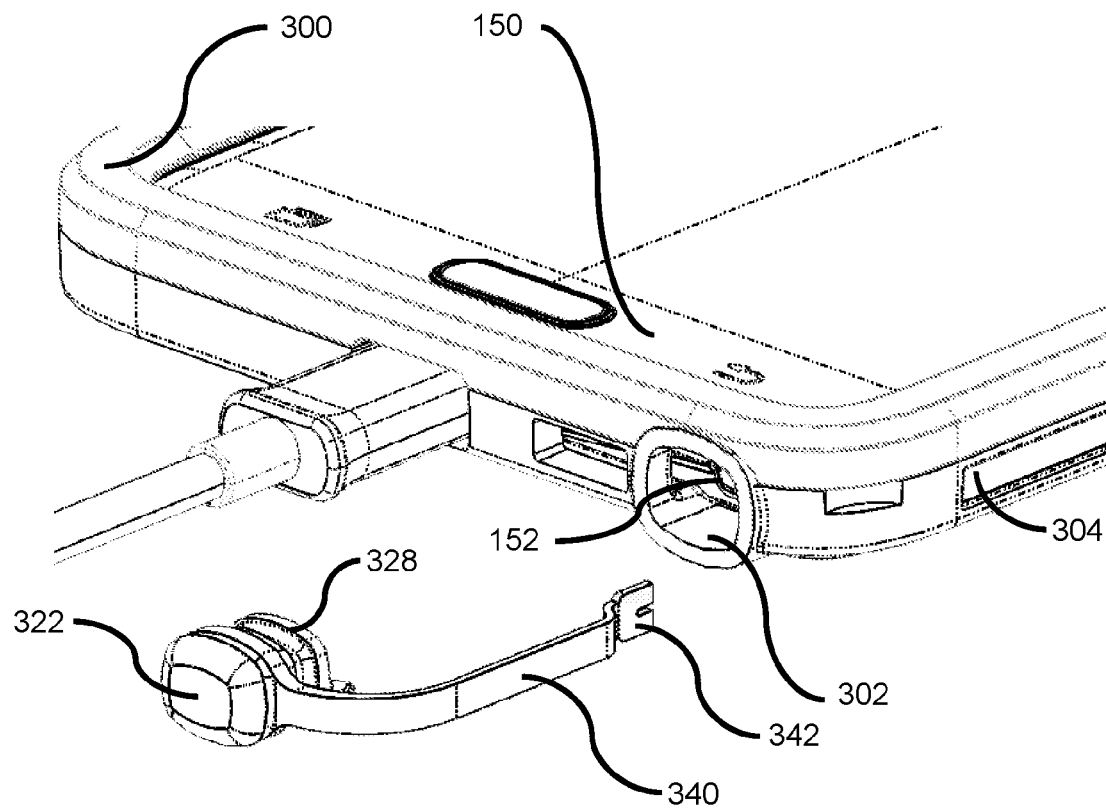
FIG. 8 shows an exploded perspective view of a removable cap with associated tether and shell without a stylus.

Another embodiment of removable cap 322 and shell 300 are illustrated in an exploded perspective view in FIG. 8, with the stylus removed for clarity. Aperture 302 of shell 300 is aligned with corresponding aperture 152 in the housing of portable electronic device 150, to allow insertion and removable of a stylus (not shown) into a receptacle. Removable cap 322 includes channel 328 around its circumference that can hold a gasket (gasket not shown for clarity), the gasket configured to press against the inner surface of shell aperture 302 when removable cap 322 is inserted, thereby creating a seal. In some embodiments, the seal can be water resistant. Tether 340, configured as a strap in FIG. 8, is connected to removable cap 322. FIG. 8 shows shell anchor end 342 unconnected to shell 300 for clarity, although shell anchor end 342 can be connected to shell slot 304 (see also FIG. 10). The cross-sectional geometry of the cap portion can be the same as or different from that of the rest of the stylus.

Figure 9:
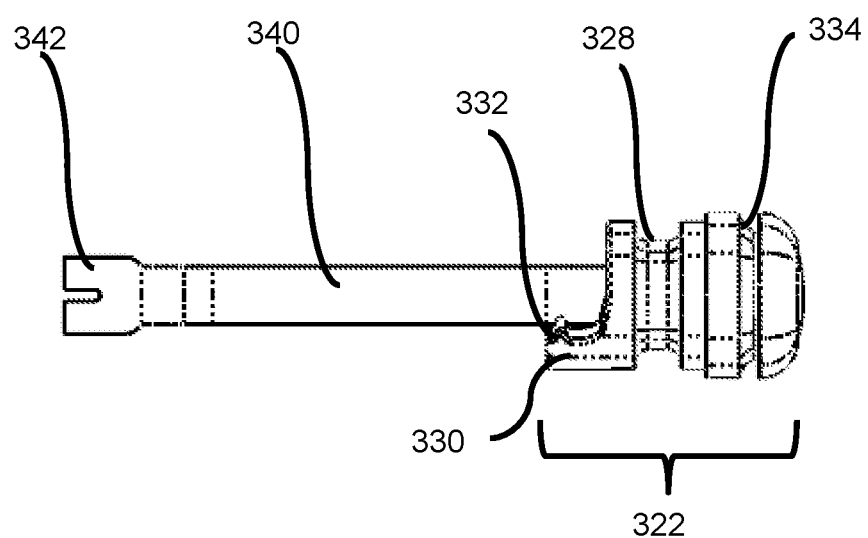
FIG. 9 shows a side view of a removable cap and tether.
Figure 10:
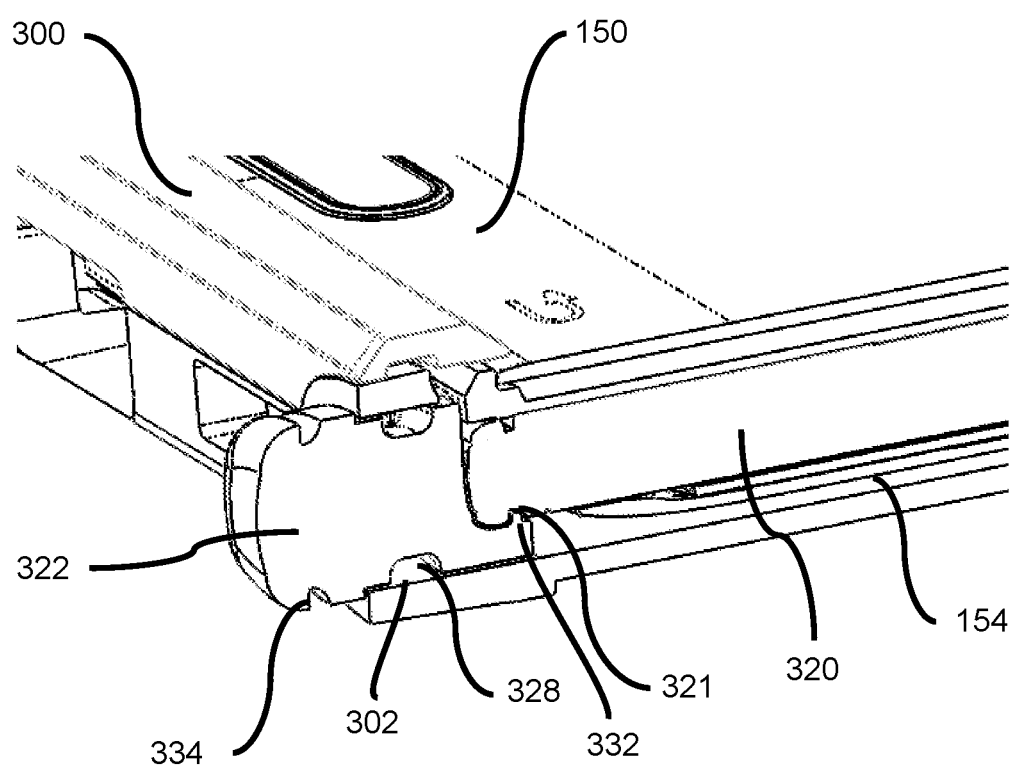
FIG. 10 shows a perspective sectional view of a removable cap and stylus inserted into an aperture of the shell and the receptacle of a portable electronic device.
Figure 11:
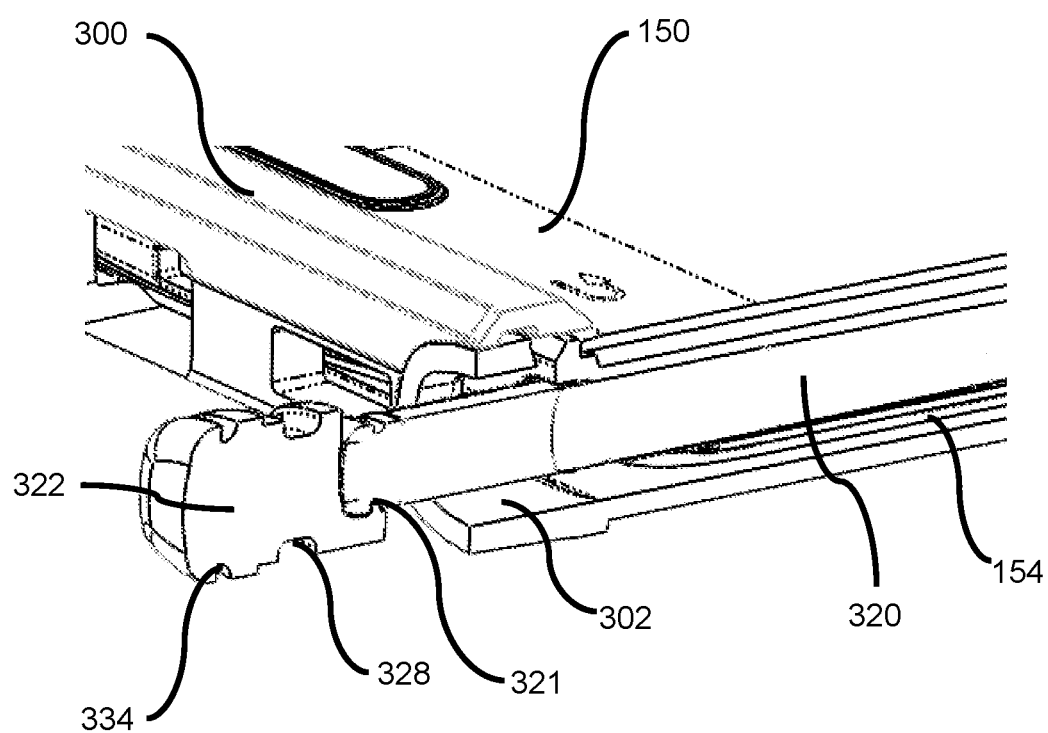
FIG. 11 shows a perspective sectional view of a removable cap and stylus partially inserted into an aperture of the shell and the receptacle of a portable electronic device.

FIG. 9 illustrates a side view of removable cap 322 and tether 340. Removable cap 322 includes extended arm 330 on an inner end of removable cap 322. Extended arm 330 includes cap securing element 332, configured in FIG. 9 as a hook or protrusion. Cap securing element 332 and its interaction with stylus 322 is shown in FIG. 10. FIG. 10 shows a side sectional view of removable cap 322 and stylus 320 inserted through aperture 302 and into receptacle 154 of portable electronic device 150. Similarly, FIG. 11 shows a side sectional view of removable cap 322 and stylus 320 partially removed from aperture 302 and receptacle 154. Cap securing element 332 interfaces with stylus securing element 321, configured as a groove in FIG. 10, and enables stylus 320 to be slid in and out of shell 300 and portable electronic device 150. For example, removable cap 322 can be pulled outward, thereby pulling stylus 320 outward from shell 300. When a sufficient length of stylus 320 has been removed beyond aperture shell 302, a user can grasp the stylus and remove stylus completely from shell 300 and portable electronic device 150. Conversely, stylus 320 can be partially inserted through aperture 302 and into portable electronic device 150, and removable cap 322 can be used to push stylus 320 the remaining length into shell 300 and portable electronic device 150, with cap securing element 332 contacting stylus securing element 321 to allow future removal of stylus 320.

Removable cap 322 also includes removal indentation 334 around the circumference of the removable cap 322. Removal indentation 334 provides a region for which a fingernail or tool can be applied to pull on removable cap 322, thus facilitating its removal from portable electronic device 150. In some embodiments, the outer surface of removable cap 322 can include a textured surface to facilitate its removal. Such embodiments can be utilized with the removable caps and cap portions disclosed throughout this specification.

Figure 12:
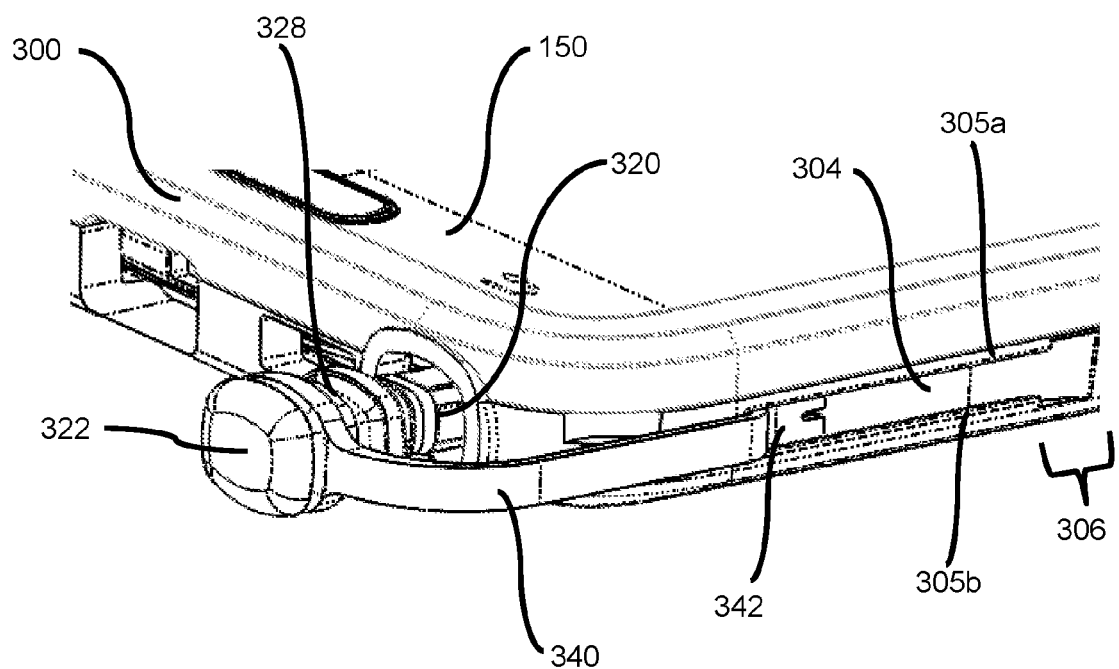
FIG. 12 shows a perspective view of a removable cap, tether, and stylus partially inserted into a shell and portable electronic device.

A tether can also be attached between removable cap 322 and shell 300. The tether can be formed from a stretchable material, such as silicone or another elastomer, to allow removable cap 322 to move relative to shell 300 while removing and inserting stylus 320. In some embodiments, the tether can be formed of a semi-rigid plastic and can slide along a portion of shell 300 while remaining connected to shell 300. For example, returning to FIG. 9, tether 340 is configured as a flexible strap. Shell anchor end 342 is configured as a tab with a paddle-like shape that is wider than the width of the remainder of tether 340. Shell anchor end 342 fits into shell slot 304 (see FIGS. 8 and 12) and is retained in shell slot 304 by slot overhangs 305a-b. As shown in FIG. 12, shell slot 304 permits shell anchor end 342 to be removed from shell slot 304. Slot overhangs 305a-b do not extend the entire length of shell slot 304, exposing an anchor removal area 306 through which shell anchor end 342 can be removed. Shell slot 304 can also be ramped at anchor removal area 306 to facilitate insertion and removal of shell anchor end 342. In some embodiments, shell anchor end 342 can also be configured as a post oriented 90 degrees outward with respect to shell slot 304, the post having a tab and cover that partially sandwiches the slot overhangs to retain the tether. In certain embodiments, shell slot 304 may not have an anchor removal area, and the tether may be non-removably anchored to shell 300. In some embodiments, the slot overhangs can be replaced with a cover that retains shell anchor end 342 and can receive a portion of tether 340 when removable cap 322 is attached to shell 300.

The term "about" as used herein in reference to quantitative measurements, refers to the indicated value plus or minus 10%. For example, "about 90%" would encompass 80-100%, inclusive. Moreover, where "about" is used herein in conjunction with a quantitative term it is understood that in addition to the value plus or minus 10%, the exact value of the quantitative term is also contemplated and described. For example, the term "about 90%" expressly contemplates, describes, and includes exactly 90%.

Terms and phrases used in this document, and variations thereof, unless otherwise expressly stated, should be construed as open ended as opposed to limiting. As examples of the foregoing: the term "including" should be read to mean "including, without limitation" or the like; the term "example" or "exemplary" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. Additionally, where a range is set forth, the upper and lower limits of the stated range are each inclusive of all of the intermediary units therein.

The foregoing description is intended to illustrate but not to limit the scope of the disclosure, which is defined by the scope of the appended claims. Other embodiments are within the scope of the following claims.

What is claimed:

1. A waterproof protective case for a portable electronic device, the portable electronic device having a storage area for storing a stylus, the waterproof protective case comprising:
   a shell that at least partially encloses the portable electronic device, the shell comprising an aperture aligned with an opening of the storage area of the portable electronic device when the portable electronic device is in the protective case; and
   a cap configured to removably attach to a first end of the stylus, the aperture of the shell configured to releasably retain the cap when the stylus is inserted into the opening of the storage area of the portable electronic device, the cap configured to form a waterproof seal when the cap is retained within the aperture of the shell, the cap further configured to remove the stylus from the storage area of the portable electronic device when the portable electronic device is in the waterproof protective case.

2. The waterproof protective case of claim 1, wherein the cap comprises one or more cap retention elements that interact with one or more retention elements on a surface of the aperture of the shell to retain the cap.

3. The waterproof protective case of claim 2, wherein the one or more cap retention elements are protrusions and the one or more retention elements on the surface of the aperture are grooves.

4. The waterproof protective case of claim 1 further comprising a gasket, wherein the cap comprises a cap groove configured to retain the gasket.

5. The waterproof protective case of claim 1, further comprising a tether that connects the cap to the shell.

6. The waterproof protective case of claim 5, the shell further comprising a slot that allows an end of the tether to slide along a side of the waterproof protective case.

7. The waterproof protective case of claim 1, wherein the cap comprises an inner cap retention element that interacts with a stylus retention element on the stylus to attach the cap on the stylus.

8. The waterproof protective case of claim 1, wherein the cap is permanently connected to the first end of the stylus.

9. A protective encasement for a portable electronic device, the portable electronic device having a storage area for storing a stylus, the portable electronic device having a sensor that senses the insertion and removal of the stylus in the storage area, the protective encasement comprising:
   a shell that at least partially covers the portable electronic device, the shell comprising an aperture configured to allow access to the storage area of the portable electronic device when the portable electronic device is in the protective encasement, the aperture of the shell configured to receive and retain a removable cap,
   the removable cap of the protective encasement configured to attach to an end of the stylus, the removable cap configured to allow the attached stylus to substantially extend into the storage area of the portable electronic device and interact with the sensor of the portable electronic device when the portable electronic device is in the protective encasement, the removable cap further configured to remove the attached stylus from the storage area of the portable electronic device through the aperture of the shell.

10. The protective encasement of claim 9, wherein the shell and the retained removable cap are configured to make the protective encasement waterproof.

11. The protective encasement of claim 9, wherein to allow the attached stylus to substantially extend into the storage area of the portable electronic device includes to allow the stylus to extend into the storage area only to a maximum distance that is less than a distance the stylus will extend into the storage area when the protective encasement and the cap are not present, while still configured to enable the stylus to interact with the sensor of the portable electronic device.

12. The protective enclosure of claim 9, wherein the removable cap includes an indentation to assist in removal of the removable cap from the aperture of the shell.

13. The protective enclosure of claim 9, wherein the removable cap includes a textured surface to assist in removal of the removable cap from the aperture of the shell.

14. The protective encasement of claim 9, wherein the removable cap comprises one or more cap retention elements that interact with one or more retention elements on a surface of the aperture.

15. The protective encasement of claim 14, wherein the one or more cap retention elements are grooves and the one or more retention elements on the surface of the aperture are protrusions.

16. A protective case for a portable electronic device, the portable electronic device having a receptacle for storing a stylus, the portable electronic device having a sensor that detects the insertion and removal of the stylus from the receptacle of the portable electronic device, the protective case comprising:
   a protective shell that at least partially encases the portable electronic device, the protective shell comprising an aperture aligned with an opening of the receptacle of the portable electronic device, the aperture of the protective shell configured to allow the stylus to be inserted into and removed from the receptacle of the portable electronic device while the portable electronic device is installed in the protective case; and
   a cap attached to an end of the stylus, the cap configured to be removably retained in the aperture of the protective shell, the cap configured to allow the stylus to substantially extend into the receptacle of the portable electronic device and interact with the sensor of the portable electronic device.

17. The protective case of claim 16, the cap comprising a removal indentation configured to assist in removing the cap from the aperture of the protective shell.

18. The protective case of claim 16, further comprising a tether removably attached to the protective shell and connected to the cap.

19. The protective case of claim 18, the tether removably attached to the protective shell in a slot of the protective shell.

20. The protective case of claim 16, wherein to allow the attached stylus to substantially extend into the receptacle of the portable electronic device includes to allow the stylus to only extend up to 90% of a length of the receptacle while still configured to enable the stylus to interact with the sensor of the portable electronic device.

* * * * *

UNITED STATES PATENT AND TRADEMARK OFFICE
CERTIFICATE OF CORRECTION

| | | |
|---|---|---|
| PATENT NO. | : 9,577,697 B2 | Page 1 of 1 |
| APPLICATION NO. | : 15/167554 | |
| DATED | : February 21, 2017 | |
| INVENTOR(S) | : Marc A. Richmond et al. | |

It is certified that error appears in the above-identified patent and that said Letters Patent is hereby corrected as shown below:

In the Claims

Column 8, Line 15, Claim 11 the phrase "the cap" should read --the removable cap--.

Column 8, Line 18, Claim 11 the phrase "The protective enclosure" should read --The protective encasement--.

Column 8, Line 21, Claim 12 the phrase "The protective enclosure" should read --The protective encasement--.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*